United States Patent [19]
Lin et al.

[11] Patent Number: 5,974,204
[45] Date of Patent: Oct. 26, 1999

[54] PEN TYPE DATA SCANNING APPARATUS

[75] Inventors: Shih-Chieh Lin; Chien-Suan Chen, both of Taipei, China

[73] Assignee: Primax Electronics Ltd., Taipei Hsien, Taiwan

[21] Appl. No.: 08/092,223

[22] Filed: Jul. 15, 1993

[51] Int. Cl.[6] .................................................. G06K 9/22
[52] U.S. Cl. ............................................................ 382/314
[58] Field of Search ................................. 382/59, 65, 67, 382/313, 314, 321, 323; 348/376, 75, 158, 233; 235/473, 483, 472, 454, 485; 710/12, 14, 31

[56] References Cited

U.S. PATENT DOCUMENTS

| | | | |
|---|---|---|---|
| 3,541,248 | 11/1970 | Young | 382/59 |
| 3,918,028 | 11/1975 | Humphrey et al. | 340/146.3 F |
| 4,631,599 | 12/1986 | Cawkell | 358/285 |
| 5,121,226 | 6/1992 | Kubota et al. | 358/473 |
| 5,130,847 | 7/1992 | Tsujioka | 358/473 |
| 5,276,443 | 1/1994 | Gates et al. | 340/825.06 |
| 5,301,243 | 4/1994 | Olschafskie et al. | 382/59 |
| 5,301,244 | 4/1994 | Parulski | 382/59 |

FOREIGN PATENT DOCUMENTS

WO91/16688  10/1991  WIPO ............................. G06K 9/22

OTHER PUBLICATIONS

Mano, *Computer System Architecture,* Prentice–Hall (1982), pp. 403–415, 432–439, 443–454.

*Primary Examiner*—Andrew W. Johns
*Attorney, Agent, or Firm*—F. Eric Saunders; Raymond E. Roberts; Michael J. Hughes

[57] ABSTRACT

A pen type scanner (10) having an optically conductive light director (24) for directing light from a light emitting diode (20) onto a specific portion of textual data (78) on a page (76). Light reflected from the page is focused by a lens assembly (28) onto a sensor apparatus (30). As the pen type scanner (10) is moved across the page (76) a roller (34) activates a distance encoder (32). The pen type scanner (10) is connected to a parallel port (54) of a computer (56) through an interconnection cable (50) and a port adaptor component (58).

16 Claims, 4 Drawing Sheets

PEN TYPE DATA SCANNING APPARATUS

TECHNICAL FIELD

The present invention relates generally to the field of digital data encoding and more particularly to an improved optical scanning device for encoding data into a digital computer. The predominant current usage of the pen type data scanning apparatus is in the conversion of data from preexisting printed materials into digital format suitable for use by a computer.

BACKGROUND ART

To "scan", as the term will be used herein, means to convert visually perceptible information, by electo-optical means, into a digital format. It is known in the art to scan printed material into such a digital format for manipulation and use within a digital computer. Early success in this field primarily involved the scanning of pictures, and the like, since the information contained within a pictorial image can be stored, manipulated, transmitted and received in digital format without any need to identify the content of the image. Typically, scanning produces a "bit mapped" image. That is, a record is made regarding a plurality of pixel locations forming a data grid corresponding to the original image. In the simplest form, the data for each pixel is strictly binary, representing either a darkened pixel location or a relatively light pixel location. In more sophisticated "gray scale" scanning, a record is made of the relative darkness of each pixel location within a gradient of values. In color scanning, a record is made of the color content of a plurality of pixel locations in the image. In any case, pictorial data may be stored in such bit mapped format.

Of course, since computers excel in the manipulation of textual and numerical data, it has clearly been desirable to import such data directly from printed matter into the computer, thus avoiding the necessity of manual entry of such data. However, the introduction of textual and numerical data into a computer presents an additional problem. It is not sufficient merely to import an image of the data. Rather, the computer must "recognize" the data contained within the image and convert it into a format usable by the computer (such as "ASCII" data format, or the like). In order to accomplish this purpose a category of software known as Optical Character Recognition ("OCR") software has been developed. Early attempts at OCR software were relatively crude in that only particular type faces and sizes could be recognized, and errors were so common that the OCR software was only marginally useful. However, more recent efforts at OCR provide a considerable improvement. Modern OCR software is increasingly accurate and can recognize a wide variety of type faces. Indeed, OCR software is being advanced to the point that handwriting may be recognized and deciphered.

Given the proliferation of OCR software and the ready availability of inexpensive yet powerful computers in which such software can be used, we are now presented with the opportunity of importing data at will from printed material into our computers. Much benefit can be derived from this development. Entire pages of text can be imported into word processing systems for future reference and other purposes. An important advantage of the OCR process is that a page of data in ASCII format (or other digital format) takes up a very much lesser portion of the storage capacity of a computer than does a bit mapped image of the page. Therefore, much more data can be archived, to later be called up on a computer screen or printed out for the user's benefit. However, even this is not the greatest advantage of the OCR process. Users are finding that the greatest benefit is that short passages, quotations, and the like can be integrated into the user's own documents. In many fields of endeavor this is an extremely important benefit. As just one example, in doing legal research it is necessary to cull through many volumes of reference materials taking short passages and citations from each. In subsequently writing a legal brief based upon such research, the user must accurately reproduce these passages. Formerly, the user was required to make notes (or photocopies) as the material was researched, and then later to type the passages on the computer keyboard so that they could be included in a word processor created brief or other such document. Using the OCR technology, such passages can be directly imported into the user's text.

Today, available scanners are generally sheet type scanners which scan an entire page of information in a single operation, or hand held type scanners which can scan a section of a page, such as a strip about four inches wide, in a single operation. It has generally been considered that the larger the area scanned in a single operation, the better the purpose of the device is served, since less work is required to scan a full page of data, and further since "registration" problems (the alignment of scanned portions of an image to correspond to the original image) are reduced by keeping the number of scans required to cover the image to a minimum. Therefore, the smaller hand held scanners are generally seen as inferring no particular advantage, as compared to the sheet type scanners, relating directly to the scanning process. Rather, the advantage of hand held scanners is that they are less expensive to produce, and generally much smaller and lighter than the sheet type scanners, such that the hand held scanners may be readily transported to the information sources.

As useful as are conventional hand held scanners, they are not well suited for the importation of selected portions of data. To the inventors' knowledge, no prior art scanner has allowed a user to easily scan selected portions of data into a computer. All prior art scanners have either required that relatively large blocks of a page be scanned together, or else have been ungainly and difficult to handle due to the conventional manner in which scanners are constructed.

DISCLOSURE OF INVENTION

Accordingly, it is an object of the present invention to provide a means for scanning selected portions of data from a page.

It is another object of the present invention to provide a scanner which is inexpensive to produce and to use.

It is yet another object of the present invention to provide a scanner which uses a port which is available on most computers such that no special interface is required.

It is still another object of the present invention to provide a scanner which can be used with small portable computers.

It is yet another object of the present invention to provide a means for scanning data into a computer which does not unnecessarily use computer storage space to store extraneous data.

It is still another object of the present invention to provide a means for scanning data into a computer which fits comfortably in a user's hand, such that it may be accurately positioned on selected data.

Briefly, the preferred embodiment of the present invention is a scanner which transmits data to a computer through the printer port of the computer, such that no special interface card is required (since many small portable computers with which the present inventive scanner is intended to operate do not have provision for attachment of additional interface cards). The scanner has an elongated, generally rectangular, tubular housing with a light source and a light sensor located in a proximal end thereof. The light source is conventional in nature and the light sensor is generally conventional except that it is much smaller (and, therefor, less expensive and more conservative of limited power resources) than comparable light sensors in conventional scanners. The elongated shape of the housing is made possible by a light director, which directs light from the light source out of the distal end of the housing and further by a lens assembly, which focuses light entering the distal end of the housing onto the light sensor. A guide roller and alignment unit are provided for use in positioning the scanner.

An advantage of the present invention is that it can be easily positioned over selected portions of data.

A further advantage of the present invention is that only those portions of data which are desired need be scanned into a computer.

Yet another advantage of the present invention is that it is comfortable and convenient to use, even for persons with relatively small hands.

Still another advantage of the present invention is that a small and inexpensive light sensor is employed, thus significantly reducing the overall cost of the scanner.

Yet another advantage of the present invention is that it does not require a special interface, and thus can be used even with small computers which cannot be equipped with such a special interface.

These and other objects and advantages of the present invention will become clear to those skilled in the art in view of the description of the best presently known modes of carrying out the invention and the industrial applicability of the preferred embodiment as described herein and as illustrated in the several figures of the drawing.

BEST MODE FOR CARRYING OUT INVENTION

The best presently known mode for carrying out the invention is pen type scanner which connects directly to the parallel port of a personal computer. The predominant expected usage of the inventive pen type scanner is in the importation of selected passages of data into computers during examination of printed data for business or scholastic purposes.

Figure 1:
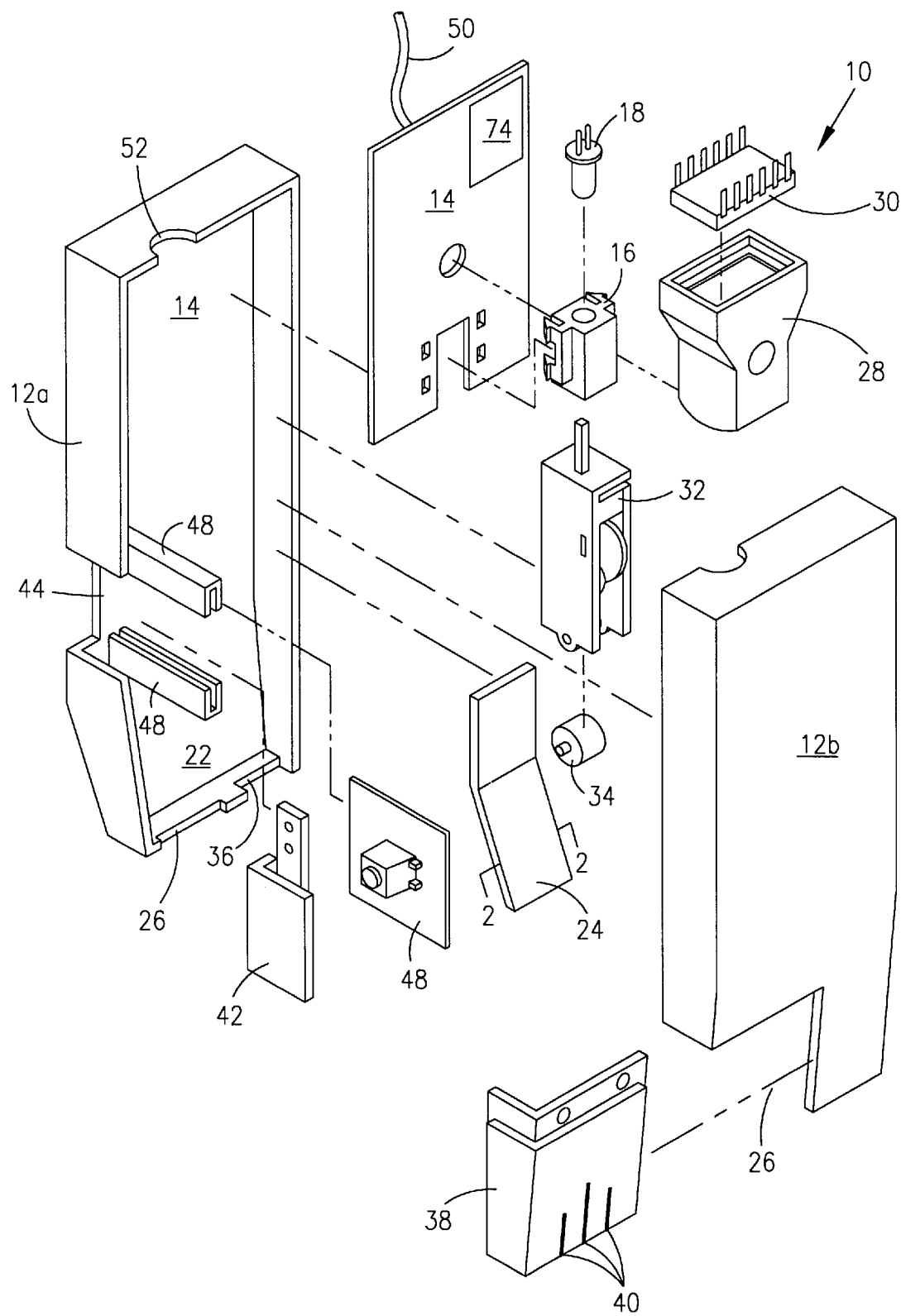
FIG. 1 is an exploded perspective view of a pen type scanner, according to the present invention.

The pen type scanner of the presently preferred embodiment of the present invention is illustrated in an exploded perspective view in FIG. 1 and is designated therein by the general reference character 10. Electrical connections within the pen type scanner 10 are conventional in nature and are not illustrated in the view of FIG. 1 in order to better illustrate the inventive aspects of the pen type scanner 10.

Figure 2:
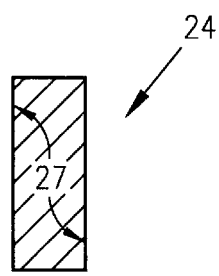
FIG. 2 is a cross sectional view of the light director taken along line 2—2 of FIG. 1.

The pen type scanner 10 has a housing 12 which, for manufacturing purposes, has a left housing portion 12a and a right housing portion 12b which, when joined, form the housing 12. A circuit board 14 located within a proximal end 16 of the housing 12 has mounted thereon a light source housing 18 with a light emitting diode ("LED") 20 therein. Light is directed from the LED 20 toward and out of a distal end 22 of the housing 22 by a light director 24. The light director 24 is an optically conductive component formed so as to transmit light therethrough from the LED 20 around the other components within the relatively cramped housing 12 such that the light can emit from a sensor port 26 attached to the distal end 22 of the housing. The exact shape of the light director 24 will, accordingly, vary with minor alterations in the shape of the housing 12 and other components contained therein. As can be seen in the view of FIG. 1, the light director 24 is generally rectangular in cross section such that light emitted therefrom will evenly illuminate a generally bar shaped area, as is appropriate to the purpose of reading a generally bar shaped portion of data at any given instant. FIG. 2 is a cross sectional view of the light director 24 taken along line 2—2 of FIG. 1. An outer surface 27 of the light director 24 is inwardly reflecting such that light is transmitted through the light director 24 with a minimal amount of loss through the outer surface 27.

A lens assembly 28 has mounted at the top thereof a sensor apparatus 30 and the lens assembly 28 is affixed to the circuit board 14 such that light entering the housing 12 through the sensor port 26 is focused by the lens assembly 28 onto the sensor apparatus 30.

Also rigidly affixed within the housing 12 is a distance encoder 32 with a roller 34 attached thereto. The distance encoder 32 is affixed to the housing 12 such that, when the pen type scanner 10 is fully assembled, the roller 34 projects partially through a roller port 36 at the distal end 22 of the housing 12. One skilled in the art will recognize that the roller 34 will turn the distance encoder 32 as the pen type scanner 10 is moved across printed data to provide a signal which corresponds to a second dimension (horizontal, in normal operation) of information complementing the (normally vertically oriented) information contained in signals provided from the sensor apparatus 30, such that the two dimensions of an image are transmitted electrically from the pen type scanner 10.

In the best presently known embodiment 10 of the present invention, mounted on the sensor port 26 is an alignment component 38 with a plurality (three, in the best presently known embodiment 10) of registration markings 40 thereon for assisting the user in consistently aligning the pen type scanner 10 in relation to the particular data to be scanned. The alignment component 38 is semi-transparent (green tinted plastic in the best presently known embodiment of the invention) such that a user can see therethrough, by looking closely at the alignment component 38, the data over which the pen type scanner 10 is positioned and can align the registration markings 40 with the data.

A switch cover 42 is movably affixed within a switch access port 44 in the housing 12. A pair of mounting brackets 46 are molded into the left housing portion 12a for holding an electrical switch 48 such that the electrical switch 48 is activated when the user depresses the switch cover 42. The electrical switch 48 activates the pen type scanner 10 such that, when the electrical switch 48 is activated using the switch cover 42, and further when the distance encoder 32 is activated by movement of the roller 34, data is transmitted from the pen type scanner 10.

An interconnection cable 50 extends from the circuit board 14 through a cable aperture 52 in the housing 12.

Figure 3:
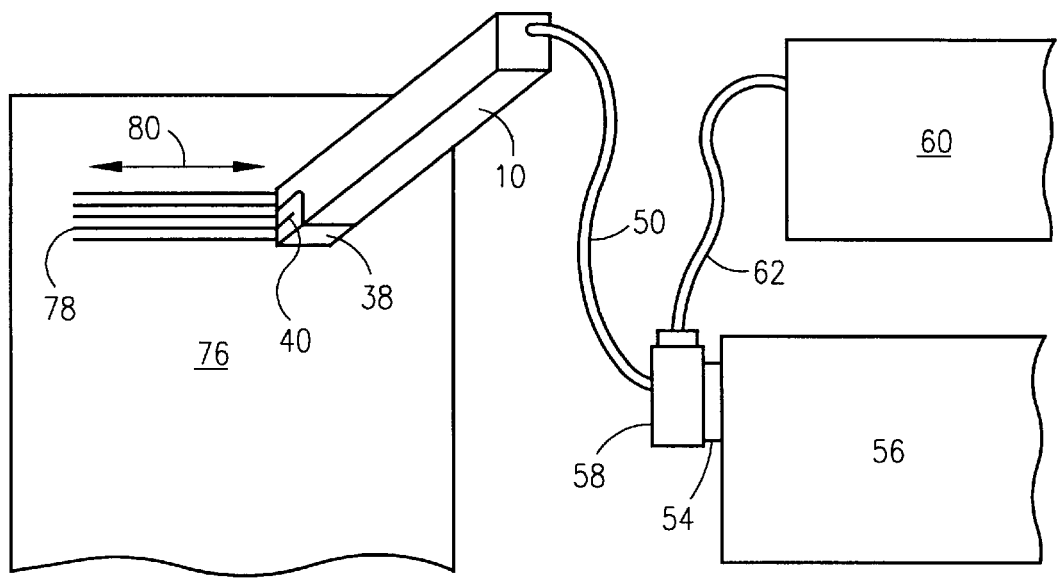
FIG. 3 is a perspective view of the pen type scanner of FIG. 1, showing an example of usage thereof.

FIG. 3 is a perspective drawing of the pen type scanner 10 showing an example of usage thereof. In application, the interconnecting cable 50 connects the pen type scanner 10 to a parallel port 54 (sometimes referred to as a printer port) of a computer 56 through a port adaptor component 58. The port adaptor component 58 is provided so that a printer 60 may optionally be connected to the computer 56 via a printer cable 62.

Figure 4A:
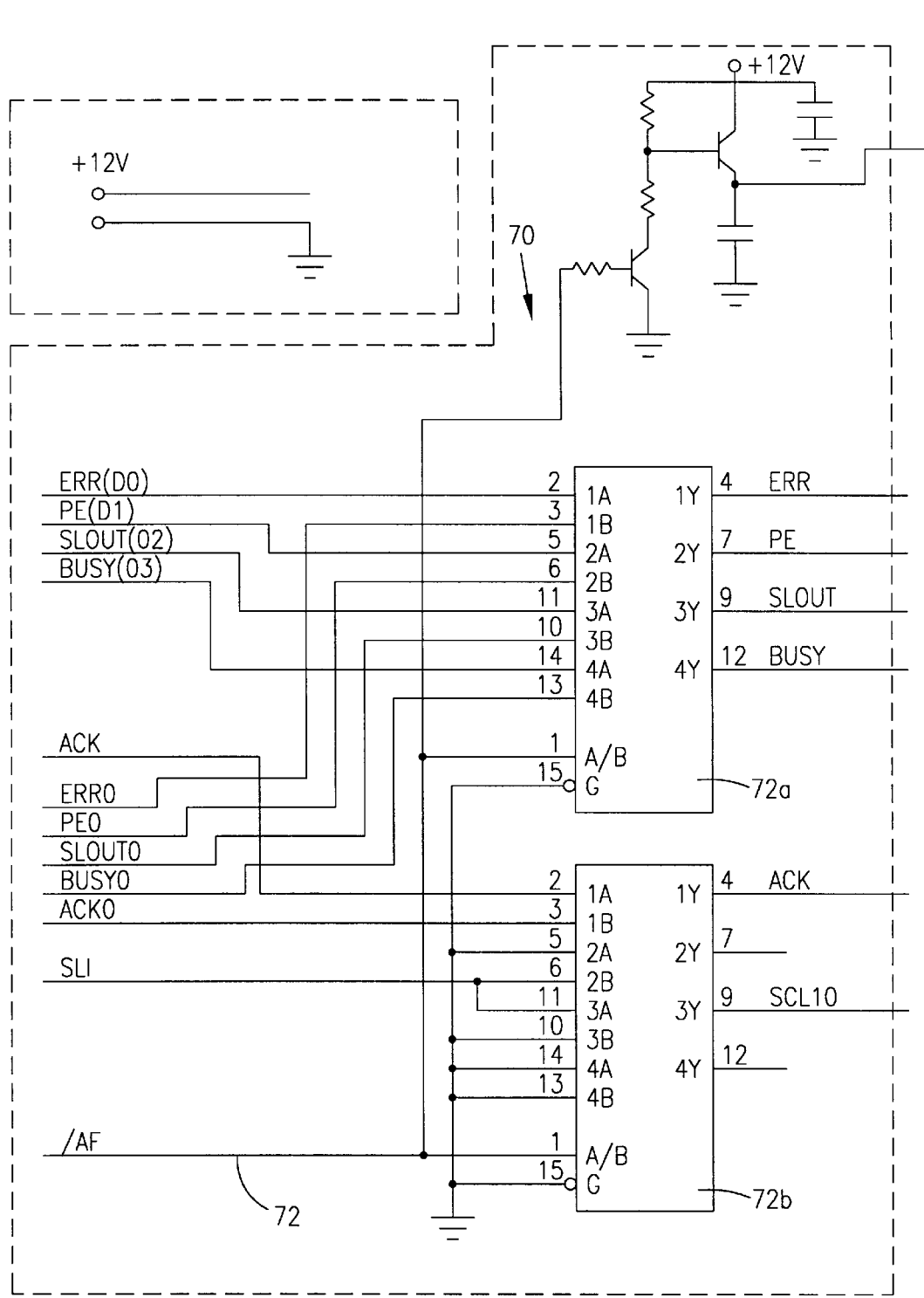
FIG. 4 is a schematic diagram of the port adaptor component of FIG. 3.
Figure 4B:
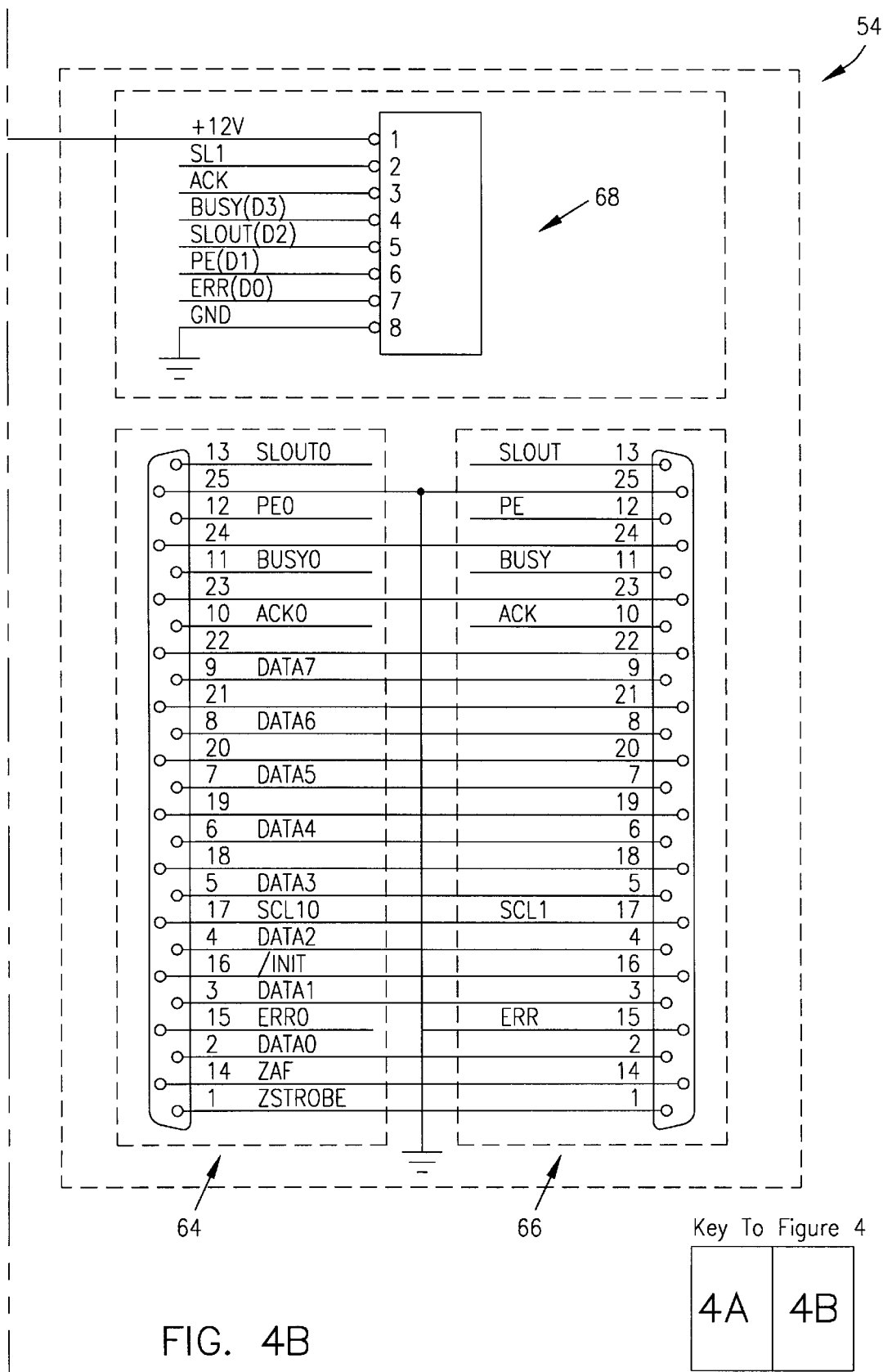

FIG. 4 is a schematic diagram of the port adaptor component 58 of FIG. 57. The port adaptor component 58 has a first parallel connector 64 for connection to the printer cable 62 (FIG. 3) and a second parallel connector 66 for connection to the computer 56 (FIG. 3). A scanner connector 68 is provided for connection to the pen type scanner 10 via the interconnection cable 50 (FIG. 3).

An automatic switching circuit 70 has two four bit multiplexers 72a and 72b for alternatively switching connection between the second parallel connector 66 and either the first parallel connector 64 or the scanner connector 68 depending upon the status of an automatic feed line 72, which status is such that connection is between the computer 56 (FIG. 3) through the second parallel connector 66 and the pen type scanner 10 (FIG. 3) through the scanner connector 68 when the electrical switch 48 of the pen type scanner 10 is depressed and the distance encoder 32 is caused to send a signal by rotation of the roller 34. Under conditions other than that just described, connection is between the second parallel port 66 and the first parallel port 64.

In the best presently known embodiment 10 of the present invention, in order to reduce the effect of instability in the reflected light received at the sensor apparatus 30, an automatic background processing circuit 74 (FIG. 1) is provided. One skilled in the art will be familiar with automatic background canceling circuits whereby the effect of variables such as color and reflectivity of material being scanned or inclination angle of the pen type scanner 10 is reduced by effecting a maximum degree of contrast in the image. The principle of operation of automatic background cancelling circuit is based on processing the image signal with integration to use as a comparison reference to serve the background process purpose. However, prior to the present invention, a function such as is provided by the present automatic background canceling circuit 74 has not been included as a fixed element of the circuitry of a scanner, since it is generally inappropriate to cancel the background when capturing an image as important visual information may be included in the background. Only under the inventive principles of the present invention, wherein selected blocks of data are immediately converted by OCR to character information format (after which process, the visual aspect of the data becomes irrelevant) is it always desirable to cancel the background.

Referring again to FIG. 3, in use the user will position the pen type scanner 10 over a page 76 such that a specific portion of textual data 78 (represented by lines in the view of FIG. 3) is aligned with the registration marks 40 on the alignment component 38. To scan the textual data 78, the user will depress the switch cover 42 to activate the pen type scanner 10 and the move the pen type scanner horizontally (as indicated by a horizontal movement arrow 80 with the roller 34 (FIG. 1) in contact with the page 58 such that the roller both serves as a guide and steadying device for the movement of the pen type scanner 10 and further causes the distance encoder 32 to emit a series of signals corresponding to the movement of the pen type scanner 10. As will be recognized by one skilled in the art, the sensor apparatus 30 will then produce a series of signals representing a generally one dimensional image which series will combine to represent the two dimensional textual data 78.

Usage in the manner described above will allow the user to enter selected portions of the textual data 78 without the necessity of also scanning irrelevant data. Therefore, not only is data storage capacity within the computer 56 conserved, a significant amount of processing time which might otherwise be required to convert the irrelevant data from bit mapped format into ASCII or other computer recognizable format. Further time and effort which would otherwise be required to later edit out such irrelevant data is saved.

As is shown above, in great part, the pen type scanner 10 according to the present invention resembles prior art conventional hand held scanners in many respects. Among the substantial differences is that the unique configuration permits the user to scan data horizontally, line by line, such that only those portions of data which are required are scanned. This unique configuration is made possible by use of the inventive light director 24, as described herein. No significant changes of materials are envisioned nor are any special constructions required except that, as previously discussed herein, the sensor apparatus 30 is smaller (lower pixel count) as compared to previously used comparable light sensors.

Various modifications may be made to the invention without altering its value or scope. For example, While the best presently known embodiment of the inventive pen type scanner 10 described herein and illustrated in the drawings is quite slim in shape, such that it is adapted to the purpose described herein, it is not appreciably smaller than some other devices known in the art, such as a small scanner which is disclosed but not claimed in Patent Cooperation Treaty International Publication Number WO 91/16688. However, the unique construction described herein is not limited by the specific size and shape of the best presently known embodiment 10 of the present invention, and even smaller embodiments may be constructed, as required, according to the present invention.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The pen type scanner 10 is intended to be widely used in the importation of data into computers. The predominant current usages are for the importation of selected passages of data into small personal computers which can be readily transported, along with the pen type scanner 10, to the sources of the data (such as libraries, or the like).

When used as described above, the pen type scanner 10 the user can input selected portions of textual data 78 into the computer 56 directly such that it is stored in a format usable by word processing programs, spreadsheet programs, and the like.

The pen type scanner 10 of the present invention may be utilized in any application wherein conventional scanners are employed for the importation of relatively small blocks of data. Major areas of improvement are in the ability to accurately import selected portions of data, in the improved transportability of the pen type scanner 10 and in the ability to use the pen type scanner 10 through the parallel port 54 with a small, easily portable, personal computer 56.

Since the pen type scanner of the present invention may be readily constructed and is readily adaptable for use with existing computers and software it is expected that they will be acceptable in the industry as a substitute for the conventional scanners in many applications. For these and other reasons, it is expected that the utility and industrial applicability of the invention will be both significant in scope and long-lasting in duration.

We claim:

1. A data scanner for scanning data from a page into a computer, comprising:
   a generally pen shaped housing;
   a light source within the housing for emitting light onto the page;
   a light sensor within the housing for sensing light reflected from the page in a first dimension;
   a distance encoder for sensing movement of the data scanner across the page in a second dimension in a form such that the data can be transmitted as binary data to the computer; and
   electrically conductive means for transmitting signals from said light sensor to the computer; wherein
   the computer is a conventional general purpose personal computer.

2. The data scanner of claim 1, and further including:
   a light direction device for directing light from said light source through said housing.

3. The data scanner of claim 2, wherein:
   the light direction device is an optically conductive means such that light is transmitted through the light direction device.

4. The data scanner of claim 2, wherein:
   the light direction device is generally rectangular in cross section.

5. The data scanner of claim 2, wherein:
   the light direction device has an inwardly reflective outer surface covering at least a portion thereof.

6. The data scanner of claim 1, and further including:
   a guiding device for having thereon a registration mark for aligning the data scanner with the data on the page.

7. The data scanner of claim 6, wherein:
   the guiding device is at least partially transparent such that a user can view the data through the guiding device as the data scanner is positioned over the data.

8. The data scanner of claim 1, and further including:
   a lens for focusing light reflected from the page onto the light sensor.

9. The data scanner of claim 1, wherein:
   said electrically conductive means is adapted for connection to a parallel port of the computer.

10. The data scanner of claim 1, wherein:
    said electrically conductive means is adapted for connection to a parallel port of the computer through a port adaptor component, the port adaptor component having therein a switching means for switching connection from the computer between a printer connector and the data scanner.

11. The data scanner of claim 10, wherein:
    the switching means switches to connection from the computer to the data scanner when the data scanner is in use and further switches to connection between the computer and the printer connector when the data scanner is not in use.

12. The data scanner of claim 1 wherein:
    said light source is located in a proximal end of said housing and light is emitted from a distal end of said housing.

13. The data scanner of claim 10, wherein:
    said light sensor is located in the proximal end of said housing and light entering the distal end of said housing is focused onto said light sensor by a lens.

14. A method for capturing data into a computer, in steps comprising:
    positioning an alignment marking of an optical scanner over a printed line of the data;
    activating said optical scanner and moving said optical scanner horizontally such that the data is scanned by the optical scanner;
    electrically canceling the background from the output of the optical scanner;
    performing optical character recognition on the output from the optical scanner as the data is scanned; and
    storing the data in the computer in character format.

15. The method of claim 14, wherein:
    the data is provided from said optical scanner into the computer through a parallel port of the computer.

16. The method of claim 14, wherein:
    the data is provided from said optical scanner into the computer through a parallel port of the computer and further through a port adaptor, the port adaptor being provided with a switching means for switching connection from the computer between said optical scanner and a printer connector of the port adaptor.

* * * * *